United States Patent Office 3,075,404
Patented Jan. 29, 1963

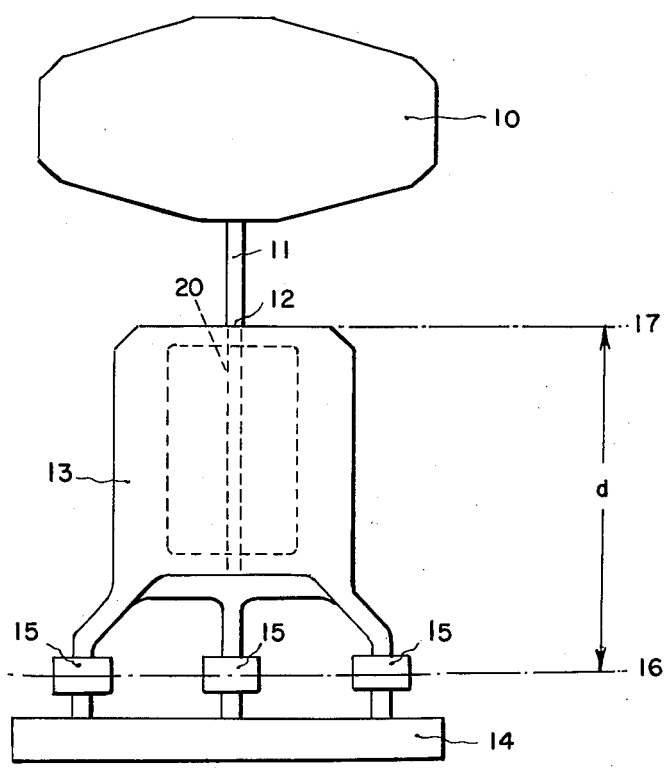

3,075,404
ROTOR SUPPORT
Erwin Wiedemann, Riehen, Switzerland, assignor, by mesne assignments, to Saul & Co., Newark, N.J., as nominee of Fidelity Union Trust Company
Filed Jan. 28, 1953, Ser. No. 333,741
Claims priority, application Switzerland Jan. 28, 1952
3 Claims. (Cl. 74—573)

The present invention relates to a device for supporting rotors of centrifuges and similar machines having vertical axes, the said device having the advantage that it can also be used to support rotors rotating at speeds in excess of 20,000 revolutions per minute.

It is known that if a high speed rotor with a vertical axis is operated as a self-centering system it runs without vibration and remains in a stable state. Self-centering, i.e. rotation about a centroidal axis, can be brought about, for example, by use of a flexible driving-shaft or coupling. In order to prevent the occurrence of undesirable precession or nutation oscillations in such systems it has furthermore been proposed that a form of support should be used which adequately compensates the forces arising at right angles to the axis of rotation, thereby stabilizing the rotary system. These principles are employed, for example, in the construction of certain spinning centrifuges. An advantage of this construction is that it permits stable operation, even when considerable unbalance is present, as the position of the centroidal axis can be varied within certain limits.

Experience has nevertheless shown that if the speed of rotation is increased beyond 18,000 revolutions per minute, the above system becomes unstable, so that safe operation is no longer possible.

The object of the present invention is to provide a rotating system with vertical axis capable of stable rotation at any desired speed up to the limits allowed by the mechanical strength of the material of construction, the said rotating system comprising a driving part, which may be an ordinary electric motor, and a driven part consisting of a rotor and a flexible supporting shaft, the said driven part representing a gyroscopic system which is permitted to rotate about its centroidal axis by the flexibility of said supporting shaft. It has been found that the stable gyroscopic rotation of said driven part is only possible if the base of the said flexible shaft is allowed to move about a mean position. This freedom of movement is therefore regarded as the essential feature of the rotating system which forms the object of the present invention. The base of said flexible shaft may be situated either within or outside the driving part (e.g. motor) or may form a part of it. The only condition is that the base of said flexible shaft should be free to move about a mean position, at least in a substantially horizontal plane, this mean position being determined by the equilibrium between at least three forces, as produced by springs, rubber cushions or other suitable resilient bodies, which may, at the same time, serve to limit the area of movement of the base of the flexible shaft and act as supports for the entire system.

Rotor supports corresponding to the present invention may be of very simple design. They guarantee that a system rotating gyroscopically can be operated at any desired speed without the danger of critical conditions arising.

An example of a device made in accordance with the present invention is illustrated in the accompanying drawing. The rotor 10, having a diameter of about 190 mm. and a height of about 100 mm., weighs about 3,500 gm. It is supported by a flexible steel shaft 11 of about 3 mm. diameter and having a free length of about 50 mm. The flexible shaft 11 is rigidly connected at one end to the rotor 10 and at the other to the axle 20 of the electric motor 13, being connected at the point 12, which is movable about this mean position.

The rotor 10 is driven by the electric motor 13 having a diameter of approximately 150 mm., a height of about 120 mm. and a weight of about 12,000 gm. The entire system is secured to a base-plate 14 by means of three symmetrically placed soft rubber cushions 15. For the given example, the required degree of movability and damping of the base of the flexible shaft 12 is ensured by suitably adjusting the distance $d$ between the two planes 16 and 17 within the limits 140–180 mm.

Having thus disclosed the invention what is claimed is:

1. A rotating system having a vertical axis, especially for high speed centrifuges rotating beyond the critical speed thereof, consisting essentially of a massive rotor, a flexible shaft, the upper end of said flexible shaft being directly attached to the base of said rotor, a driving motor having an axle, the lower end of said shaft being directly attached to said axle, and resiliently deformable supporting means on said motor for securing said motor on a base, said resilient supporting means disposed symmetrically about said axis and defining a supporting plane, the distance between said plane and the lower end of said flexible shaft being at least equal to the axial length of the motor, whereby the lower end of the flexible shaft is movable about a central position, and this movement will be damped in all directions by the symmetrically disposed resilient supporting means, thus not only allowing said rotor to spin about its centroidal axis but also to have the vibrations thereof at its critical speed effectively damped by the progressive resistance against any displacement of the lower end of said flexible shaft from its central position.

2. A rotating system as claimed in claim 1 in which said resiliently deformable supporting means are soft rubber blocks.

3. A system according to claim 1, wherein said driving motor is an electric motor and said rotor is a centrifuge rotor.

References Cited in the file of this patent

UNITED STATES PATENTS

| | | |
|---|---|---|
| 1,483,326 | Bock | Feb. 12, 1924 |
| 1,819,322 | Ducasse | Aug. 18, 1931 |
| 2,041,353 | Kenny et al. | May 19, 1936 |
| 2,138,531 | Wise et al. | Nov. 29, 1938 |
| 2,589,796 | Geldhof | Mar. 18, 1952 |
| 2,615,657 | Young et al. | Oct. 28, 1952 |
| 2,647,591 | Young | Aug. 4, 1953 |
| 2,670,914 | Jones | Mar. 2, 1954 |

FOREIGN PATENTS

| | | |
|---|---|---|
| 26,034 | Netherlands | Feb. 15, 1932 |